United States Patent [19]

St. John

[11] 4,016,963
[45] Apr. 12, 1977

[54] CENTRIFUGAL CLUTCH CONSTRUCTION

[75] Inventor: Richard C. St. John, North Canton, Ohio

[73] Assignee: Aspro, Incorporated, Westport, Conn.

[22] Filed: Feb. 9, 1976

[21] Appl. No.: 656,378

[52] U.S. Cl. .................... 192/105 BA; 192/114 R; 74/527
[51] Int. Cl.² ........................................ F16D 43/14
[58] Field of Search .............. 192/105 BA, 105 CD, 192/105 CE, 103 B, 114 R

[56] References Cited

UNITED STATES PATENTS

| | | | |
|---|---|---|---|
| 1,706,553 | 3/1929 | Stucatur | 192/105 BA |
| 2,534,133 | 12/1950 | Kirkpatrick | 192/105 BA |
| 2,868,343 | 1/1959 | Sproul | 192/105 BA |
| 3,850,276 | 11/1974 | Patel | 192/105 BA |

*Primary Examiner*—Benjamin W. Wyche
*Attorney, Agent, or Firm*—Frease & Bishop

[57] ABSTRACT

A centrifugal clutch construction having an outer driven member with an axially extending coupling surface, and an inner driving rotor assembly. The rotor assembly has a pair of spaced radial side plates mounted in fixed positions on a driving shaft, and a pair of hubs fixed on the shaft between the side plates. The hubs have a plurality of radially extending projections which form slots between each pair of axially aligned projections. The projections have surfaces engaging and supporting associated pairs of clutch shoes when the shoes are in retracted position. A detent plate is fixed between each pair of clutch shoes for movement with the shoes, and has a projecting surface which extends below the clutch shoes and into a respective slot between the hub projections when the shoes are in retracted position. Spring biased detent cups are located within holes formed in the hub projections and project into axially aligned holes formed in the projecting surfaces of the detent plates. The detent cups together with a garter spring which extends circumferentially around and engages the detent plates, retain the clutch shoes in retracted position. A plurality of weights are located between adjacent pairs of the clutch shoes and engage the clutch shoes when moving outward under the influence of centrifugal force to assist in overcoming the retaining force exerted by the spring biased cups on the detent plates when the shaft reaches a predetermined speed. The retaining cups and detent plates have complementary bevelled slidably engageable conical surfaces which become disengaged upon a predetermined shaft speed being reached, whereupon the clutch shoes snap into engagement with the outer driven member. The complementary bevelled conical surfaces enable the engagement speed to be more accurately determined and assist in distributing the clamping stresses over a broader contact area.

13 Claims, 12 Drawing Figures

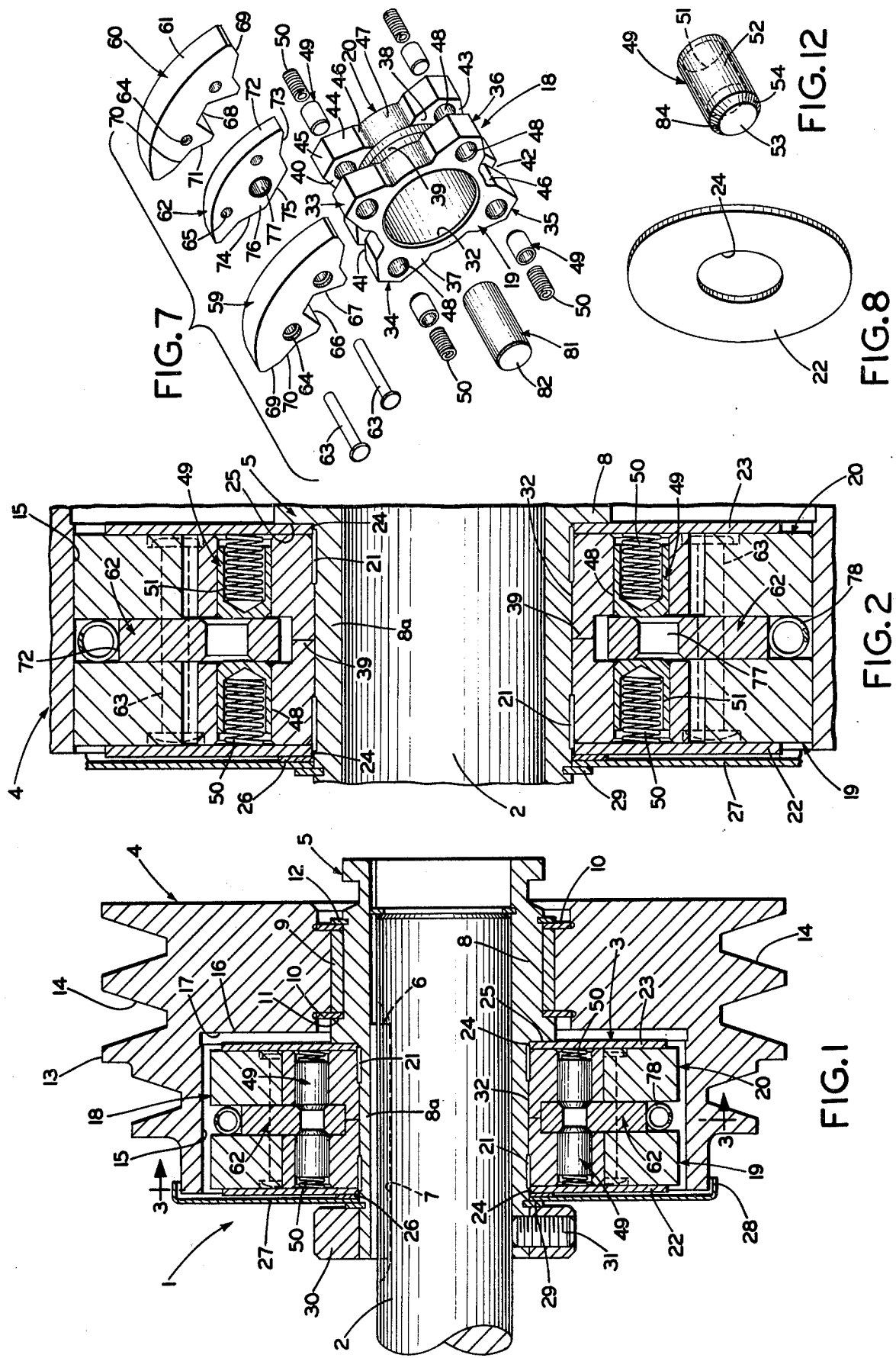

CENTRIFUGAL CLUTCH CONSTRUCTION

BACKGROUND OF THE INVENTION

1. Field of the Invention

The invention relates to centrifugal clutches and more particularly, to a centrifugal clutch construction in which the driving and driven members are coupled together instantaneously upon the driving member reaching a predetermined speed, which engagement speed is higher than the disengagement speed of the coupled members. More particularly, the invention relates to a centrifugal clutch construction in which the release speed of the clutch shoes is accurately controlled and the retaining stresses are evenly distributed by providing a conical surface-to-conical surface retaining clamping action.

2. Description of the Prior Art

There are numerous types and arrangements of centrifugal clutch constructions in which one or more clutch shoes are retained in retracted position until sufficient centrifugal forces act on the shoes to overcome a retaining spring whereupon the clutch shoes move outwardly and engage a stationary clutch drum. Such clutch constructions experience excessive wear of the clutch shoes linings since the coupling engagement is gradual as the driving member comes up to engagement speed resulting in undesirable slippage and heating between the shoe lining material and driven member.

Various centrifugal clutch constructions have been developed to provide a more sudden or instantaneous engagement of the clutch shoes with the clutch drum to eliminate such undesirable wear and heating. Many of these delayed action clutch constructions use spring means to retain the clutch shoes in retracted position and to actuate the rapid engagement. Examples of such clutch constructions are shown in U.S. Pat. Nos. 1,737,825, 2,000,713, 3,367,463, and 3,752,285.

Other clutch constructions use other delay engagement means, such as a fluid dashpot as shown in U.S. Pat. No. 3,850,276, while still other clutch constructions use spring means to achieve an instantaneous disengagement of the clutch shoes from the driven member as opposed to instantaneous engagement. Examples of these clutch constructions are shown in U.S. Pat. Nos. 2,534,133, 2,755,902, and 3,367,463.

Still other clutch constructions use spring-biased detent balls to retain the clutch shoes in retracted position. In these constructions the clutch shoes are held in clamped position by the spring biased balls requiring the centrifugal force exerted on the shoes to be sufficiently great to overcome this clamping retaining force of the spring ball detents. This clamping force generally is assisted by a continuous garter spring which extends about the outer circumference of the clutch shoes and which is used primarily for return of the shoes from extended to retraction position.

The ball detents which generally have a spherical shape, are clampingly engaged with the clutch shoes within countersunk recesses in the shoes or a projection formed on the shoes. The contact area between the spherical ball detents and the clutch shoes is generally along a straight line or at a point which will occur when a spherical surface (detent ball) contacts a flat projection or countersunk conical surface. This straight line or point contact area and resulting contact angle is difficult to determine for such clutch constructions. Thus, such relationships and characteristics make it difficult to accurately design a centrifugal clutch construction for engagement at predetermined speeds, since the release speed of the shoes from such spring-biased ball detents is largely dependent upon the contact angle between these components which, as set forth above, is difficult to determine. Such straight line or point contact areas, also present problems in such clutch constructions due to the great amount of stress exerted on such small areas, which results in undesirable breakage, wear and maintenance problems.

Furthermore, the use of springs or spring biased members in which the spring itself provides the main clamping force on the clutch shoes, presents design and operating problems in that spring characteristics are affected by change in ambient temperature, age, wear, and the like.

There is no known construction of which I am aware which provides an instantaneously engageable clutch construction which engages at a higher speed than its disengagement speed, which uses spring biased members to retain the clutch shoes in retracted position until sufficient centrifugal force is developed in the shoes, and in which the clutch shoe clamping engagement is through a conical surface-to-conical surface contact area which enables the contact angle between the clamping members to be accurately determined, thereby enabling the release speed to be accurately determined, and which distributes the contact stress between the clamping members over a greater area than in known clutch constructions.

SUMMARY OF THE INVENTION

Objectives of the invention include providing a centrifugal clutch construction in which the clutch shoes are prevented from moving outwardly by frictional clamping forces exerted on the shoes until a predetermined speed of rotation is reached, and in which the shoes then move outwardly in a sudden and instantaneous manner to their full extent of outward movement to cause a coupling engagement between the driving and driven members; providing such a clutch construction which is engageable at a higher speed than the disengagement speed of the clutch construction; providing such a clutch construction in which the retaining frictional forces exerted on the shoes is exerted by spring biased detents which provide conical surface-to-conical surface contact between the clutch shoes and detents, thereby enabling the contact angle and corresponding clutch release speed to be accurately determined, and to provide greater contact area over which the force can be distributed; providing such a clutch construction in which the clutch shoes are slidably engaged with tapered supporting surfaces on the rotor as the shoes move outwardly to engaged position with the driven member, which surfaces prevent excess rotational movement of the shoes upon coupling with the driven member and which assist in absorbing the rotational forces exerted on the shoes upon coupling engagement; providing such a clutch construction in which a plurality of weights are located between the clutch shoes to increase the centrifugal force exerted on the shoes; and providing a centrifugal clutch construction which is of a relatively simple arrangement, easy to manufacture and assemble, sturdy and durable in use, and which eliminates difficulties heretofore encountered with other known clutch constructions, achieves the objectives indicated, and solves problems and satisfies needs existing in the art.

These objectives and advantages are obtained by the centrifugal clutch construction, the general nature of which may be stated as including a driven clutch member having an axially extending coupling surface; drive shaft means; rotor means mounted on the drive shaft means for rotation with the shaft means, said rotor means being formed with a plurality of radially extending slots; a plurality of shoe means mounted on the rotor means and movable radially between retracted and extended positions; the shoe means having an outer frictional coupling surface adapted to drivingly engage the axially extending coupling surface of the driven clutch member when the shoe means are in extended position; detent plate means formed on each of the shoe means extending radially inwardly toward the drive shaft means and located within a respective rotor means slot; inwardly tapered conical surface means formed on each of the detent plate means, said surface means being located within the rotor means slots when the shoe means are in retracted positions; a plurality of detent means mounted on the rotor means and movable axially into respective slots of the rotor means, said detent means being formed with conical outer ends complementary to the conical surface means of the detent plate means; first spring means biasing the shoe means radially inwardly toward retract position; second spring means biasing the detent means axially toward a respective conical surface means of the detent plate means, with the conical ends of the detent means engaging the complementary conical surface means of the detent plate means; and the detent means and first spring means retaining the shoe means in retracted position until the drive shaft means reaches a predetermined speed, said shoe means and detent plate means moving radially outwardly under the influence of centrifugal force from retracted toward extended position disengaging the detent means conical end from engagement with the detent plate conical surface means, whereupon the clutch shoe means snap outwardly from retracted to extended position and drivingly engage the driven clutch member.

BRIEF DESCRIPTION OF THE DRAWINGS

A preferred embodiment of the invention — illustrative of the best mode in which applicant has contemplated applying the principle — is set forth in the following description and shown in the accompanying drawings, and is particularly and distinctly pointed out and set forth in the appended claims.

FIG. 1 is a sectional view of the improved centrifugal clutch construction in disengaged position;

FIG. 2 is an enlarged fragmentary sectional view of the clutch shoe and rotor assembly components of the clutch construction of FIG. 1 shown in engaged position;

FIG. 7 is an exploded perspective view showing portions of the centrifugal clutch rotor and friction shoe assembly;

FIG. 8 is a perspective view of an end plate of the improved centrifugal clutch assembly;

FIG. 12 is an enlarged perspective view of one of the friction detent cups of the improved clutch construction.

Similar numerals refer to similar parts throughout the drawings.

DESCRIPTION OF THE PREFERRED EMBODIMENT

Figure 3:
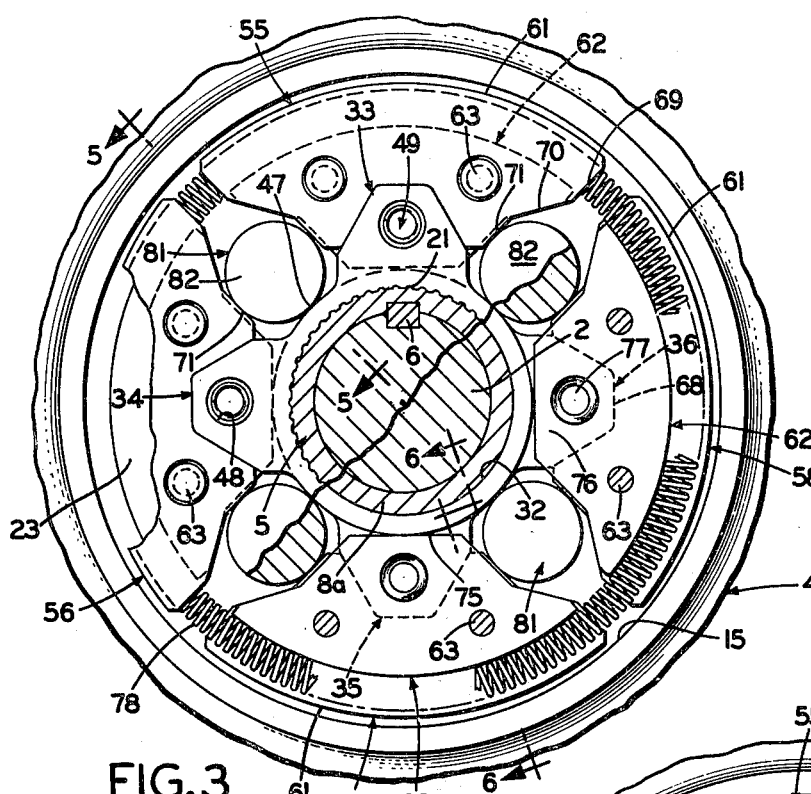
FIG. 3 is a sectional view with parts broken away taken on line 3—3, FIG. 1, showing the improved clutch construction in disengaged position.

The improved clutch construction is indicated generally at 1 and is shown particularly in FIGS. 1 and 2. Clutch 1 is driven by a power driving shaft 2, and includes a rotor assembly 3, and a driven clutch member 4. Clutch assembly 1 is shown in disengaged position in FIG. 1 and in driving engaged position in FIG. 2.

Rotor assembly 3 includes a cylindrically-shaped, axially extending hub 5 which is telescopically mounted on shaft 2 and is connected thereto by a key 6 engaged within a keyway 7 formed in shaft 2. Hub 5 has a thickened end portion 8 on which driven clutch member 4 is rotatably mounted by a bearing ring 9. Bearing ring 9 is located between a pair of thrust washers 10 which are maintained in position by a shoulder 11 formed on hub 5 and by a retaining snap end ring 12.

Clutch member 4 is shown as a multiple V-grooved pulley 13 having a plurality of external V-grooves 14, which an axially extending inner cylindrical surface 15 and a radially extending inner surface 16 forming an annular recess 17 within pulley 13. Inner surface 15 of pulley recess 17 is concentric to and extends axially parallel to the axis of shaft 2, and provides the coupling surface for drivingly connecting clutch member 4 with rotor assembly 3. Driven clutch member 4 may have various configurations and arrangements, and may be adapted to be operatively engaged with various mechanisms other than a V-groove pulley belt without departing from the concept of the present invention. The important aspect of driven member 4 is the providing of a generally axially extending coupling surface for engagement with the driving member.

Rotor assembly 4 includes a core 18 comprising a pair of rotor members 19 and 20 (FIG. 7) which are mounted on a reduced end portion 8a of hub 5 by a splined force-fit connection 21 (FIGS. 1, 3 and 4) so as to rotate with hub 5 and shaft 2.

A pair of spaced outer and inner side plates 22 and 23 (FIGS. 1, 2 and 8) are mounted on reduced end portion 8a of hub 5 with core 18 being mounted therebetween. Side plates 22 and 23 have annular configurations with enlarged central openings 24 through which reduced hub end portion 8a extends. Side plate 23 abuts an annular shoulder 25 formed at the junction of hub portions 8 and 8a, with outer side plate 22 being retained against rotor member 19 by a wave washer 26. A circular cup-shaped end housing 27 having an inturned, outer flange 28 is mounted on reduced hub portion 8a and is retained in position against wave washer 26 by a snap ring 29. A collar 30 is telescopically mounted on hub 5 and is secured to shaft 2 by a setscrew 31 (FIG. 1).

Rotor members 19 and 20 are similar, each having a central bore 32 through which reduced hub end portion 8a extends, and a plurality of radially extending projections 33, 34, 35 and 36. Rotor members 19 and 20 each have an outer surface 37 and an inner surface 38 with an annular boss 39 surrounding each bore 32 and projecting outwardly therefrom toward and into abutting relationship with boss 39 of the opposite rotor member. Bosses 39 maintain inner surfaces 38 of rotor members 19 and 20 in a spaced relationship forming slots 40, 41, 42 and 43 between spaced projections 33, 34, 35 and 36, respectively, the purpose of which is discussed below.

Rotor projections 33–36 are similar, each having a generally trapezoidal configuration with a pair of upwardly, inwardly tapered flat side surfaces 44 which terminate in a flat top surface 45. Side surfaces 44 terminate in smaller tapered side surfaces 46 which are connected with adjacent projection surfaces 46 by curved circumferential surfaces 47.

An opening 48 is formed in each projection 33–36, with openings 48 or rotor member 19 aligning with a respective opening 48 in the adjacent projections of rotor member 20 as shown in FIG. 7. Openings 48 need not extend completely axially through projections 33–36, and can be recesses extending inwardly from inner surfaces 38 in order to provide the desired results.

In accordance with the invention, a friction detent cup 49 is slidably mounted within each opening 48, and is biased by a spring 50 outwardly of opening 48 toward the adjacent rotor member and into a respective slot 40–43. Detent cups 49 each have a cylindrical shape with a hollow bore 51 formed by cylindrical side wall 52 and a flat end wall 53. End wall 53 extends transversely with respect to the axis of cup 49 and is connected to side wall 52 by a conical surface 54. Springs 50 are located within bores 51 of detent cups 49 and engage a respective side plate 22 or 23, and are in compression biasing cups 49 into a respective one of the slots 40–43 through a respective rotor opening 48.

A plurality of clutch friction shoe assemblies 55, 56, 57 and 58 (FIGS. 3, 4 and 7) are mounted on rotor member projections 33, 34, 35 and 36, respectively, when in retracted position prior to outward radial movement into extended clutch engaging position with driven clutch member 4, when acted upon by centrifugal force. Shoe assemblies 55–58 are similar, each comprising a pair of friction shoe elements 59 and 60 (FIG. 7) having outer arcuate friction coupling surfaces 61, and an interposed detent plate 62. Shoe elements 59 and 60 may be formed entirely of frictional material or may be formed of various materials such as steel, with a frictional lining mounted on coupling surfaces 61. Detent plates 62, preferably, are formed of metal, probably hardened steel, to resist the high contacts stresses when operating the detents, and to provide weight to shoe assemblies 55–58 and are assembled with shoe elements 59–60 by pairs of rivets 63 which extend through holes 64 and 65 formed in shoe elements 59–60 and detent plates 62, respectively.

Each friction shoe element 59 and 60 has a trapezoidal-shaped recess 66 defined by inwardly tapered surfaces 67 which terminate in a flat bottom surface 68.

Surfaces 67 and 68 are complementary to rotor member projection surfaces 44 and 45, respectively, which projections provide a seat-like arrangement for the clutch shoe assemblies when the assemblies are in the retracted position of FIG. 3. Coupling surfaces 61 of the shoe elements are connected to recesses 66 by three inwardly, downwardly tapered side wall segments 69, 70 and 71, as shown in FIGS. 3, 4 and 7.

Detent plates 62 are similar, each having an outer arcuate surface 72 and side wall segments 73 and 74 which are tapered inwardly with respect to arcuate surface 72, and which terminate in a flat straight bottom wall 75. Side wall segments 73 and 74, together with bottom wall segment 75 form a clamping projection area 76 which extends radially, inwardly with respect to outer surface 72. A detent receiving opening 77 is formed centrally in projection area 76.

Figure 4:
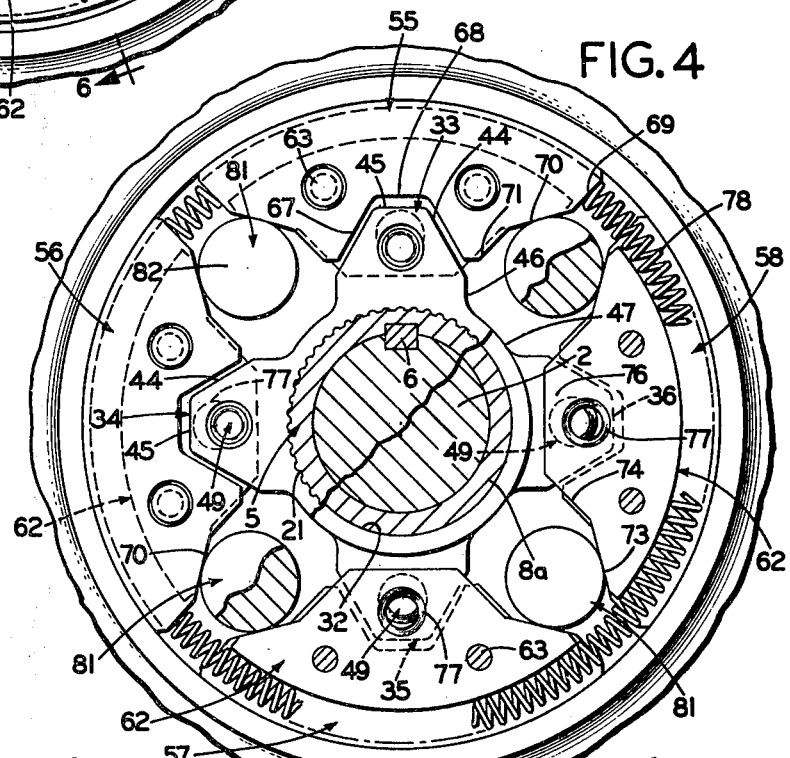
FIG. 4 is a view similar to FIG. 3 showing the improved clutch construction in engaged position.

A continuous garter spring 78 extends about clutch shoe assemblies 55–58 and engages arcuate surfaces 72 of detent plates 62 retaining the shoe assemblies in retracted position on projections 33–36 or rotor members 19 and 20 (FIGS. 3 and 4). Friction shoe elements 59 and 60 are supported by the projections of rotor members 19 and 20, respectively (FIGS. 1 and 2), when in retracted position, with clamping areas 76 of detent plates 62 extending between the spaced projections of rotor members 19 and 20 and into one of the respective slot 40–43. Detent plate projection areas 76 extend below bottom surface 68 of the clutch shoe elements 59 and 60 when connected therebetween by rivets 63.

Figures 9, 10, 11:
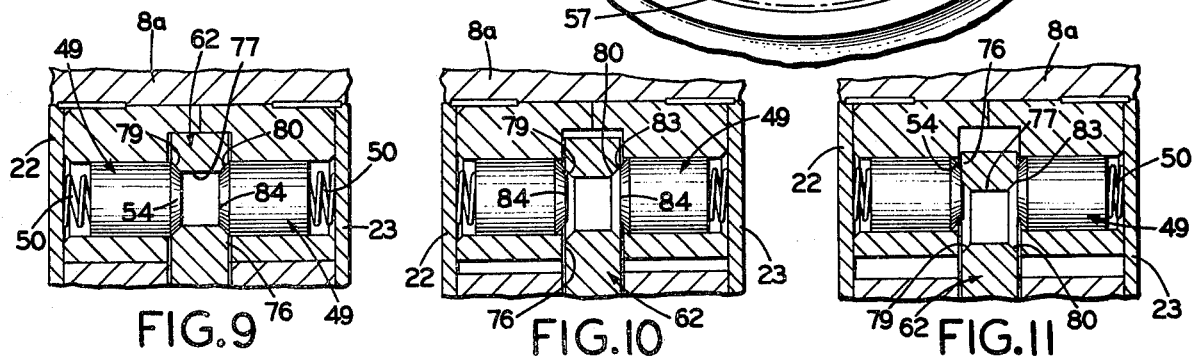
FIG. 9 is a fragmentary sectional view of the lower portion of FIG. 2 showing the clutch shoes and detent plate in retracted positions.
FIG. 10 is a view similar to FIG. 9 showing the clutch shoes and detent plate in an intermediate position.
FIG. 11 is a view similar to FIGS. 9 and 10 showing the clutch shoes and detent in fully extended position.

In further accordance with the invention, openings 77 of detent plates 62 are provided with countersink areas which surround the openings on both side surfaces of the detent plates. These countersink areas form inwardly tapered conical surfaces 79 and 80 on the detent plates (FIGS. 9–11). Countersink surfaces 79 and 80 preferably have a predetermined degree of taper and size which is complementary to the degree of taper and size of conical surfaces 54 of detent cups 49 for the reasons set forth below.

Figure 5:
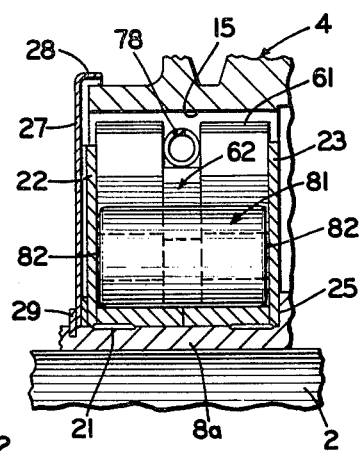
FIG. 5 is a fragmentary sectional view taken on line 5—5, FIG. 3, showing particularly the clutch weights in retracted position.
Figure 6:
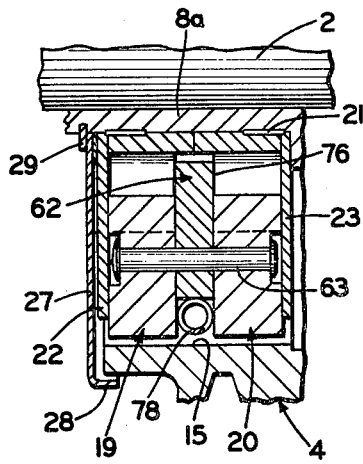
FIG. 6 is a fragmentary sectional view taken on line 6—6, FIG. 3, showing particularly the assembly of the detent plate with the clutch friction shoe elements.

Weights 81 are mounted between adjacent pairs of clutch shoe assemblies 55–58 to increase the amount of centrifugal force acting on the clutch shoe assemblies, to assist the shoe assemblies in moving outwardly into coupling engagement with driven member 4. Weights 81 preferably have a cylindrical shape (FIGS. 5 and 7) with an axial length complementary to the axial separation of side plates 22 and 23. Such a length enables weights 81 to be freely movable in a radial direction between and along side walls 22 and 23 without experiencing frictional drag between end walls 82 of weights 81 and side plates 22 and 23, and still be of a sufficient length to prevent excess axial movement of the weights between the spaced side walls.

Weights 81 have a predetermined diameter enabling the weights to contact side wall segments 71 of adjacent friction shoe elements 59 and 60 and circumferential surface 47 of rotor members 19 and 20, when the weights are at rest between adjacent retracted shoe assemblies as shown in FIG. 3. This particular sizing and location of weights 81 prevents unnecessary movement of the weights within the clutch construction reducing noise and chatter between the clutch components.

The operation of the improved clutch assembly 1 is described below and is shown particularly in FIGS. 1–4 and 9–11. Detent plates 62, together with friction shoe elements 59 and 60, are held in retracted position by garter spring 78. Radial projections 33–36 of rotor members 19 and 20 are located within recesses 66 of friction shoe elements 59 and 60, with bottom surfaces 68 of recesses 66 abutting and being supported by top surfaces 45 of the rotor member projections. Clamping areas 76 of detent plates 62 are located between the spaced radial projections 33–36 in a respective one of the slots 40–43 formed therebetween.

Friction detent cups 49 are spring biased by springs 50 into the clamping retaining position of FIG. 9, with conical detent cup surfaces 54 being engaged with conical countersink surfaces 79 and 80 of detent plate opening 77. Detent cups 49 clampingly engage detent plates 62 therebetween, due to the pressure exerted on the detent cups by springs 50, preventing any outward movement of shoe assemblies 55–58. Weights 81 assume their retracted positions of FIG. 3, in which they are located between and in contact with adjacent side surface segments 71 of shoe elements 59–60 and circumferential surface 47 of rotor members 19 and 20.

Shoe assemblies 55–58 attempt to move radially, outwardly from their retracted positions of FIGS. 1, 3 and 9 under the influence of centrifugal force as the rotational speed of shaft 2 increases. The clamping friction developed between detent plates 62 and detent cups 49 comprise the primary retention means to retain shoe assemblies 55–58 in retracted position until shaft 2 reaches a predetermined engagement speed. Garter spring 78 also exerts a retaining force on the shoe assemblies which must be overcome by the centrifugal force. The force exerted by spring 78 preferably is small when compared to the frictional or clamping retaining force exerted by cups 49 on detent plates 62 so that the operating characteristics of clutch construction 1 is not heavily dependent upon spring characteristics. Spring 78 functions primarily to return the clutch shoe assemblies and weights 81 to their retracted positions upon the speed of shaft 2 dropping below the clutch disengagement level and to retain the shoe assemblies in retracted position.

Detent plates 62, together with their connected friction shoe elements 59 and 60, will start to overcome the clamping force of detent cups 49 and spring 78 and begin to move radially, outwardly under the influence of centrifugal force as the rotor speed increases. The centrifugal force acting upon the shoe assemblies is aided by the forces exerted on tapered side wall segments 70 (FIG. 4) by adjacent weights 81. The lower half-portions of conical surfaces 79 and 80 of detent plate openings 77 will slide along corresponding conical portions of detent cup surfaces 54 as detent plates 62 begin to move radially, outwardly overcoming the biasing forces of springs 50 from the position of FIG. 9 to an intermediate position of FIG. 10. Shoe assemblies 55–58 are still disengaged from driven clutch member 4 when in the position of FIG. 10.

It is this clamping sliding frictional engagement between conical surfaces 79 and 80 of detent plate openings 77 with conical surfaces 54 of detent cups 49 which enables the contact angle between the clamped and clamping members to be readily determined, since this contact angle is dependent upon the angle of taper of the conical surfaces 54, 79 and 80. The accurate determination of this contact angle enables the release speed (which is the speed of shaft 2 at which the shoe elements drivingly engage driven member 4) to be accurately calculated. Likewise, the relatively broad contact surface areas of the engaged conical surfaces provide a greater stress area over which the clamping stresses can be distributed, in contrast to the heretofore straight line or point contact areas which occurs when a spring biased spherical detent ball is used instead of the conical end surface configuration of detent cups 49.

Clutch shoe assemblies 55–58 will automatically and instantaneously "snap" outwardly to their fully extended and engaged positions of FIGS. 2, 4 and 11 upon the outer circular edges 83 of conical surfaces 79 and 80 moving past the topmost circular edges 84 of detent cups 49 as shown in FIGS. 10 and 11. Edges 84 define circular flat end walls 53 of cups 49. End walls 53 of detents 49 will continue to press against and slidably, frictionally engage the side surfaces or areas 76 of detent plate 62, upon movement of detent plate 62 from the retracted position of FIG. 10 to the extended position of FIG. 11. This flat surface-to-flat surface frictional clamping force of FIG. 11, however, is less than that exerted on detent plates 62 by the conical surface-to-conical surface engagement of FIG. 10, and therefore, will not appreciably affect the rapidly outward movement of the clutch shoes and subsequent instantaneous and forceful engagement of clutch shoe friction surfaces 61 with axially extending clutch drum wall 15. Such instantaneous and forceful engagement eliminates the heretofore gradual clutch shoe engagement with the undesirable slipping as in many prior clutch constructions.

Clutch shoe assemblies 55–58 are shown in extended clutch drum engaging position in FIG. 4, in which position cylindrical weights 81 have moved radially outwardly into pressure engagement with side wall segments 70 of shoe elements 59 and 60. In actual operation, the leading tapered side surfaces 67 of each of the friction shoe element recesses 66 will contact and move outwardly along the leading tapered side surface 44 of rotor member projections 33–36, instead of the outward radial movement as shown in FIG. 4 with spacing occurring between both of the tapered sides 44 of the rotor member projections and tapered side surfaces 67 of recesses 66. The particular direction of rotation of shaft 2 will determine which surfaces 44 and 67 will be slidably engaged, which will be the leading surfaces.

The trapezoidal configuration of projections 33–36, in cooperative association with the trapezoidal configuration of recesses 66, enables clutch construction 1 to be dual directional without affecting its operating characteristics. This arrangement also eliminates excess sliding movement of the clutch shoes with respect to rotor members 19 and 20 upon coupling engagement with the driven member, since the engagement force is absorbed between the rotor member projections and the side walls of the shoe recesses.

Clutch shoe assemblies 55–58 will maintain their driving engagement with driven clutch member 4 until the speed of shaft 2 decreases to a predetermined level, which level is lower than that of the engagement speed. Sufficient centrifugal force is exerted on the clutch shoe assemblies and weights 81 to overcome the tension of return spring 78 to maintain this driving engagement at a lower speed than the engagement speed since the clamping friction force between conical surfaces 54 and 79–80 which retained these components in retracted positions has been removed. Only when the tension of spring 78 exceeds the centrifugal force exerted on these components and the clamping frictional force between flat end surfaces 53 of detent cups 49 and the lower portion of detent plate clamping areas 76 between openings 77 and bottom wall 75, will uncoupling or disengagement occur.

The frictional clamping force exerted by detent cups 49 which prevents engagement of the clutch shoe assemblies until a relatively high predetermined speed is obtained, also assists in maintaining the clutch shoe assemblies in coupled position, thereby providing for a lower disengagement speed. The clamping frictional force which retains the shoe assemblies in retracted position is larger than the clamping frictional force which retains the shoe assemblies in extended position, due to the conical-to-conical surface engagement of the clamping members when the shoe assemblies are in retracted position in contrast to the flat surface-to-flat surface engagement of the clamping members when the shoes are in extended position.

Accordingly, improved centrifugal clutch construction 1 provides a construction which has a rapid or "snap-in" forceful engagement with the driven clutch member upon the driving shaft reaching a predetermined speed, which engagement speed is higher than the release or disengagement speed; provides a clutch construction in which the retaining force is achieved primarily by conical surface-to-conical surface frictional engagement which enables the contact angle to be accurately determined, and correspondingly, enables the release speed to be accurately determined; provides such a clutch construction which has a relatively large force area between the clamped retaining members enabling the force per unit area to be lower than in those clutch constructions experiencing a line or point contact area; and providing a clutch construction which is simplified, effective, safe, inexpensive, and efficient, which achieves all the enumerated objectives, eliminates difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved centrifugal clutch construction is constructed and used, the characteristics of the new construction, and the advantageous, new and useful results obtained; the new and useful structures, devices, elements, arrangements, parts, and combinations, are set forth in the appended claims.

I claim:

1. Centrifugal clutch construction including:
 a. a driven clutch member having an axially extending coupling surface;
 b. drive shaft means;
 c. rotor means mounted on the drive shaft means for rotation with the shaft means, said rotor means being formed with a plurality of radially extending slots;
 d. a plurality of shoe means mounted on the rotor means and movable radially between retracted and extended positions;
 e. the shoe means each having an outer frictional coupling surface adapted to drivingly engage the axially extending coupling surface of the driven clutch member when the shoe means are in extended position;
 f. detent plate means formed on each of the shoe means and extending radially inwardly toward the drive shaft means and located within a respective rotor means slot;
 g. inwardly tapered conical surface means formed on each of the detent plate means, said surface means being located within the rotor means slots when the shoe means are in retracted positions;
 h. a plurality of detent means mounted on the rotor means and movable axially into respective slots of the rotor means, said detent means being formed with generally conical-shaped outer ends complementary to the conical surface means of the detent plate means;
 i. first spring means biasing the shoe means radially inwardly toward retract position;
 j. second spring means biasing the detent means axially toward a respective conical surface means of the detent plate means, with the conical-shaped ends of the detent means engaging the complementary conical surface means of the detent plate means; and
 k. the detent means and first spring means clampingly retaining the shoe means in retracted position until the drive shaft means reaches a predetermined speed, said shoe means and detent plate means moving radially outwardly under the influence of centrifugal force from retracted toward extended position disengaging the detent means conical-shaped ends from engagement with the detent plate conical surface means, whereupon the clutch shoe means snap outwardly from retracted to extended position and drivingly engage the driven clutch member.

2. The construction defined in claim 1 in which the rotor means is formed with a plurality of openings, at least one of which communicates with a respective one of the rotor means slots; in which each of the detent means is a cup-shaped member, one end of which is formed with and provides the detent means conical-shaped outer end; and in which the cup-shaped members are movably mounted within said rotor means openings with the conical-shaped ends projecting into a respective one of the rotor means slots.

3. The construction defined in claim 2 in which each of the cup-shaped members is formed with a central bore; and in which the second spring means extends into said bore and biases the cup-shaped member into a respective rotor means slot.

4. The construction defined in claim 2 in which each of the detent plate means is formed with an opening; and in which an annular countersink surface surrounds each of said openings to provide the inwardly tapered conical surface means on the detent plate means.

5. The construction defined in claim 4 in which a pair of cup-shaped detent members clampingly engage each of the respective detent plate means; in which the detent plate means has a pair of opposite side surfaces with the detent plate means opening extending through and communicating with both side surfaces of said plate means; and in which countersink conical-shaped surfaces are formed on both side surfaces surrounding the opening and are adapted to be clampingly engaged by the pair of detent means.

6. The construction defined in claim 1 in which a pair of side plates is mounted in spaced relationship on the drive shaft means, with the rotor means being located between said plates; and in which a plurality of weights are movably mounted between the spaced pair of plates and operatively engage the shoe means to assist said shoe means in moving outwardly toward extended position when under the influence of centrifugal force.

7. The construction defined in claim 6 in which the weights each have a cylindrical shape with an axial length complementary to the spacing between the pair of side plates.

8. The construction defined in claim 1 in which the rotor means is formed with four equally circumferentially spaced projections, with the rotor means slots being forced in said projections; in which each of the shoe means is formed with a recess, said recess having a configuration generally complementary to the configuration of the projections; and in which the projections extend into the recesses to mount the shoe means on the rotor means when the shoe means are in retracted position.

9. The construction defined in claim 8 in which the rotor means projections and the shoe means recesses have generally trapezoid-shaped configurations, each with a pair of sloped side surfaces terminating in a flat connecting surface.

10. The construction defined in claim 8 in which each of the shoe means is formed with a pair of friction shoe elements, with the detent plate means being mounted between said shoe elements; in which the recesses into which the rotor means projections extend are formed in the shoe elements; and in which the detent plate means extend beyond said recesses.

11. The construction defined in claim 10 in which the pair of frictional shoe elements extend radially outwardly beyond their respective interposed detent plate means; and in which the first spring means is a continuous garter spring and extends in a circumferential manner around the shoe means and is located between the individual friction shoe elements of each pair in contact with the interposed detent plate means.

12. The construction defined in claim 1 in which the shoe means frictional coupling surface has an arcuate shape; in which the shoe means includes side wall segments which extend downwardly inwardly from the ends of the arcuate frictional coupling surface; and in which weight means are located between adjacent pairs of shoe means and are adapted to engage the side wall segments when under the influence of centrifugal force to assist in moving the shoe means from retracted to extended position.

13. Centrifugal clutch construction including:
 a. a driven clutch member having an axially extending coupling surface;
 b. drive shaft means;
 c. rotor means mounted on the drive shaft means for rotation with the shaft means, said rotor means being formed with radially extending slots means;
 d. shoe means mounted on the rotor means and movable radially between retracted and extended positions;
 e. the shoe means having outer frictional coupling surface means adapted to drivingly engage the axially extending coupling surface of the driven clutch member when the shoe means is in extended position
 f. detent plate means formed on the shoe means and extending radially inwardly toward the drive shaft means and located within the rotor means slot means;
 g. tapered conical surface means formed on the detent plate means, said surface means being located within the rotor means slot means when the shoe means is in retracted position;
 h. detent means mounted on the rotor means and movable axially into the slot means of the rotor means, said detent means being formed with a generally conical-shaped outer end complementary to the conical surface means of the detent plate means;
 i. first spring means biasing the shoe means radially inwardly toward retracted position;
 j. second spring means biasing the detent means axially toward the conical surface means of the detent plate means, with the conical-shaped end of the detent means engaging the complementary conical surface means of the detent plate means; and
 k. the detent means and first spring means clampingly retaining the shoe means in retracted position until the drive shaft means reaches a predetermined speed, said shoe means and detent plate means moving radially outwardly under the influence of centrifugal force from retracted toward extended position disengaging the detent means conical-shaped ends from engagement with the detent plate conical surface means, whereupon the clutch shoe means snaps outwardly from retracted to extended position to drivingly engage the driven clutch member.

* * * * *

UNITED STATES PATENT AND TRADEMARK OFFICE
CERTIFICATE OF CORRECTION

PATENT NO. : 4,016,963
DATED : April 12, 1977
INVENTOR(S) : Richard C. St. John

It is certified that error appears in the above-identified patent and that said Letters Patent are hereby corrected as shown below:

Column 4, line 39, change "which" to --with--; and

Column 11, line 20, change "forced" to --formed--.

Signed and Sealed this

Fourteenth Day of June 1977

[SEAL]

Attest:

RUTH C. MASON
*Attesting Officer*

C. MARSHALL DANN
*Commissioner of Patents and Trademarks*